(12) United States Patent
Li

(10) Patent No.: US 7,761,877 B2
(45) Date of Patent: Jul. 20, 2010

(54) L DRIVING METHOD FOR DRIVING PROGRAM/INSTRUCTION EXECUTION, AND ARCHITECTURE AND PROCESSOR THEREOF

(76) Inventor: Xiaobo Li, Room 105, Building 32, Meiling Cun, No. 22, Shaoshan South Road, Changsha, Hunan (CN) 430103

( * ) Notice: Subject to any disclaimer, the term of this patent is extended or adjusted under 35 U.S.C. 154(b) by 880 days.

(21) Appl. No.: 11/630,535

(22) PCT Filed: Jun. 9, 2005

(86) PCT No.: PCT/CN2005/000826
§ 371 (c)(1),
(2), (4) Date: Dec. 21, 2006

(87) PCT Pub. No.: WO2006/000145
PCT Pub. Date: Jan. 5, 2006

(65) Prior Publication Data
US 2008/0072023 A1   Mar. 20, 2008

(30) Foreign Application Priority Data
Jun. 28, 2004   (CN) ..................... 2004 1 0049759

(51) Int. Cl.
*G06F 13/00* (2006.01)
(52) U.S. Cl. .................. 719/312; 718/100; 718/102; 712/1
(58) Field of Classification Search ............. 719/312; 718/100, 102; 712/1
See application file for complete search history.

(56) References Cited

U.S. PATENT DOCUMENTS

| | | | | |
|---|---|---|---|---|
| 5,857,103 A | * | 1/1999 | Grove | ................. 717/158 |
| 2006/0161921 A1 | * | 7/2006 | Kissell | ................. 718/102 |
| 2007/0083871 A1 | * | 4/2007 | McKenney | ................. 718/105 |

* cited by examiner

*Primary Examiner*—Andy Ho
(74) *Attorney, Agent, or Firm*—Cohen Pontani Lieberman & Pavane LLP

(57) ABSTRACT

The invention relates to computer architecture technology in the computer field. More specifically, the invention relates to a novel driving method for driving computer program/instruction execution, and a computer processor architecture and computer processor using the method. As one of the features of the invention, even on condition that no interrupt process is involved, the processor of this type can execute multiple programs in parallel on a single processor of this type exactly at the same time. Herein, the single processor relates to a single processor comprised of an instruction control section, an operation control section, a program memory section, a data memory section, and a communicating section. As another feature of the invention, a program execution driver (PED) is provided for each of the programs, and the multiple PED can manage and control the execution of multiple programs in parallel on the above single processor at the same time, independently or cooperatively with each other. The invention is adapted for design various computer processors, such as single chip micyocos, DSP and computer CPU with various scales.

20 Claims, 4 Drawing Sheets

L DRIVING METHOD FOR DRIVING PROGRAM/INSTRUCTION EXECUTION, AND ARCHITECTURE AND PROCESSOR THEREOF

PRIORITY CLAIM

This is a U.S. national stage of application No. PCT/CN2005/000826, filed on Jun. 9, 2005. Priority is claimed on the following application(s): Country: China, Application No.: 200410049759.5, Filed: Jun. 28, 2004 the content of which is incorporated here by reference.

BACKGROUND OF THE INVENTION

1. Field of the Invention

The invention relates to computer architecture technology in the computer field. More specifically, the invention relates to a driving method for driving computer program/instruction execution, called as an "L" driving method for driving computer program/instruction execution, and a computer processor architecture and computer processor using the method, wherein a program execution driver (PED) is provided for each of the programs, and on condition that no interrupt process is involved, the multiple PED manages and controls the execution of multiple programs in parallel on the above single processor at the same time, independently or cooperatively with each other. Herein, the single processor relates to a single processor comprised of an instruction control section, an operation control section, a program memory section and a data memory section, and a section-interlinking section.

2. Description of the Prior Art

The significant feature on the architecture of the conventional computer relates to a single-program-oriented architecture for execution. That is, at any time, one and only one program is running in the processor of a computer. In a practical application of the modern computer, it is common for one user to invoke multiple applications and to run multiple programs on one personal computer (PC). While composing a document by using an editor, one or even multiple picture files are downloaded from the network simultaneously, with possibly a piece of music being played, a real time monitor being performed by an antivirus program, a keyboard being typed, a mouse being moved and the like. In order to meet the requirements of the user, a PC has to spend a great deal of time on scheduling among all of these programs, and the entire performance of the system is reduced. All attribute to the fact that it is impossible for the conventional computer processor designed based on the conventional computer principle to execute multiple programs in parallel on one and the same computer processor exactly at the same time.

SUMMARY OF THE INVENTION

In order to solve the above problems, the aim of the invention is to provide a driving method for driving computer program/instruction execution, called as an "L" driving method for driving computer program/instruction execution, and a computer processor architecture and computer processor using the method. It is characterized in that even on condition that no interrupt process is involved, multiple programs can be executed in parallel on a computer processor of this type exactly at the same time. Herein, the computer processor of this type relates to a single processor comprised an instruction control section, an operation control section, a program memory section and a data memory section, and a section-interlinking section.

In the "L" driving method for driving computer program/instruction execution, and the computer processor architecture and computer processor using the method, a program execution driver, called PED hereafter, is provided for each of multiple programs, and multiple PED can manage and control the execution of the multiple programs in parallel on one and the same computer processor of this type at the same time, independently or cooperatively with each other. It is to be noted that multiple routines or subroutines constituting the program can have their respective PED.

While executable codes for each of the programs are generated, the PED for the program is generated. The PED includes at least all of related information necessary for describing and defining the attribute features of a program, and for managing and controlling the execution of the program.

In the computer processor architecture and computer processor using the "L" driving method for driving computer program/instruction execution, the system is essentially comprised of:

1) a system hardware part comprises one or more memory sections operable in parallel, such as a program memory section, a data memory section and a set of registers; one or more operation control sections operable in parallel, such as a program control and management section, a "decoding" section, an arithmetic/logic operation section and a peripheral device section; and one or more interlinking sections operable in parallel for connecting respective sections, such as a bus or buses with its control part and so on. Each of the above sections commonly has an input buffer and an output buffer. It is to be noted that:

Each of the sections in the system can operate in a request/service mode. When a request is received, that is, when the input buffer is non-empty, a specified service is performed and the result is stored into the output buffer.

If multiple sections for a service are provided repeatedly, any one among them which is idle can be selected. If all the sections are busy, the request awaits until at least one becomes idle.

The sections are divided into an exclusive type and a non-exclusive type. As for the exclusive type sections, they are preset by the system or are applied for upon the first request for the service. The result of the preset or application is stored into some items of the PED corresponding to the program.

2) A system software part is comprised of a system management program similar to an operation system (OS) in a modern computer system. The system management program is stored in a memory section, and has at least a program scheduling function and maintains at least a data structure called as a "program schedule table". When the system is initiated, the PED for the system management program is loaded into an operation control section of the system, which is called as "enabling or activating the PED". The PED drives the system management program to enable all the PED for multiple user programs one by one. Thereafter, the PED for the respective user programs drive their respective user programs to execute in parallel on one and the same computer processor at the same time, independently or cooperatively with each other.

In the "L" driving method for driving computer program/instruction execution, and the computer processor architecture and computer processor using the method, the operation method for the novel computer processors of this type designed based on the "L" driving method of the invention, that is, the method for driving the program execution by the PED is shown as follows:

1) Once executive codes for a program are generated, the system management program writes related driving information for driving execution of the program into related items of its program schedule table. Herein, the program is stored into a memory section and put into an execution wait state.

2) Once respective condition items for invoking and executing the program are met, the system management program creates/generates the PED for the program. Thereafter, the program enters an execution state and is executed independently under management and control of its PED.

3) The PED controls to fetch current instruction to be executed from a corresponding memory section, based on the stored resident information for the program such as a program memory section number and a section internal address PC.

4) When the instruction is fetched, the PED controls to "decode" the fetched instruction in an operation control section, and based on this, controls to fetch operands from a corresponding memory section, controls to perform a specified process in a corresponding operation control section, and controls to write a process result back to a corresponding memory section. It is to be noted:

Herein, the "decoding" is slightly different from the conventional decoding, as described in the subsequent chapters.

The fetched instruction, the "decoded" result for the instruction, the fetched operands and the operation result are each temporarily saved in some units of the PED.

5) Finally, after the PED modifies its PC unit of the type of the program resident information based on a mode specified by the current instruction, it controls to process the next instruction of the program as shown in Step 3).

6) The system management program will unload the PED of a program in at least following condition: an end instruction for the program is executed. This would cause a PM to set a corresponding end flag, and cause the PED of the system management program to be enabled for driving the system management program to perform a corresponding end process on the program. At last, the PED for the program is deleted from the program schedule table.

Evidently, a parallel processing can be implemented at an instruction level on the novel computer processor of this type designed based on the "L" driving method of the invention. In fact, multiple PED can manage and control the execution of multiple programs in parallel on one and the same novel computer processor of this type at the same time, independently or cooperatively with each other.

Further, resource share can be implemented at an instruction level on the novel computer processor of this type designed based on the "L" driving method of the invention. If it is not occupied currently, it can be utilized by any program's current instruction driven by its PED.

In the novel computer processors of this type designed based on the "L" driving method of the invention, the number of the activated PED is just proportional to the total amount of the resources provided by the system. If the system resources are sufficient, the number of the activated PED can be large enough. That is, the system can support sufficient large numbers of programs to be executed in parallel on one and the same computer processor at the same time.

The novel computer processor of this type designed based on the "L" driving method of the invention is substantially different from the conventional multi-computer systems, multi-processor systems and multi-CU systems, and is also substantially different from the computer processors utilizing other parallel processing technology (such as an overlay technology, an advanced control technology, a multiple-operation-section technology, a streamline technology, a super-streamline technology, a very-long-instruction-word technology, a superscale technology, a multi-thread technology and the like). Especially, the difference between the novel computer processor of this type designed based on the "L" driving method of the invention and the conventional multi-computer system consists in that: there are a number of cases in which the multiple programs can be only executed on one computer, but can not be allocated to multiple computers for execution, for example, the system programs (such as mouse, keyboard and display programs, the program such as virus monitor program) and the user programs utilizing the computer can not be allocated to multiple computers for execution, but can be only executed on one computer; In such cases, it is an only way for the conventional multi-computer system to use interrupt techniques to "convert" multiple programs into one "macro" program to be executed on a single computer. However, in the novel computer processor of this type designed based on the "L" driving method of the invention, even on condition that no interrupt process is involved, the above multiple programs can be executed in parallel on a single computer processor of this type designed based on the "L" driving method of the invention at the same time.

DETAILED DESCRIPTION OF THE INVENTION

Figure 1:
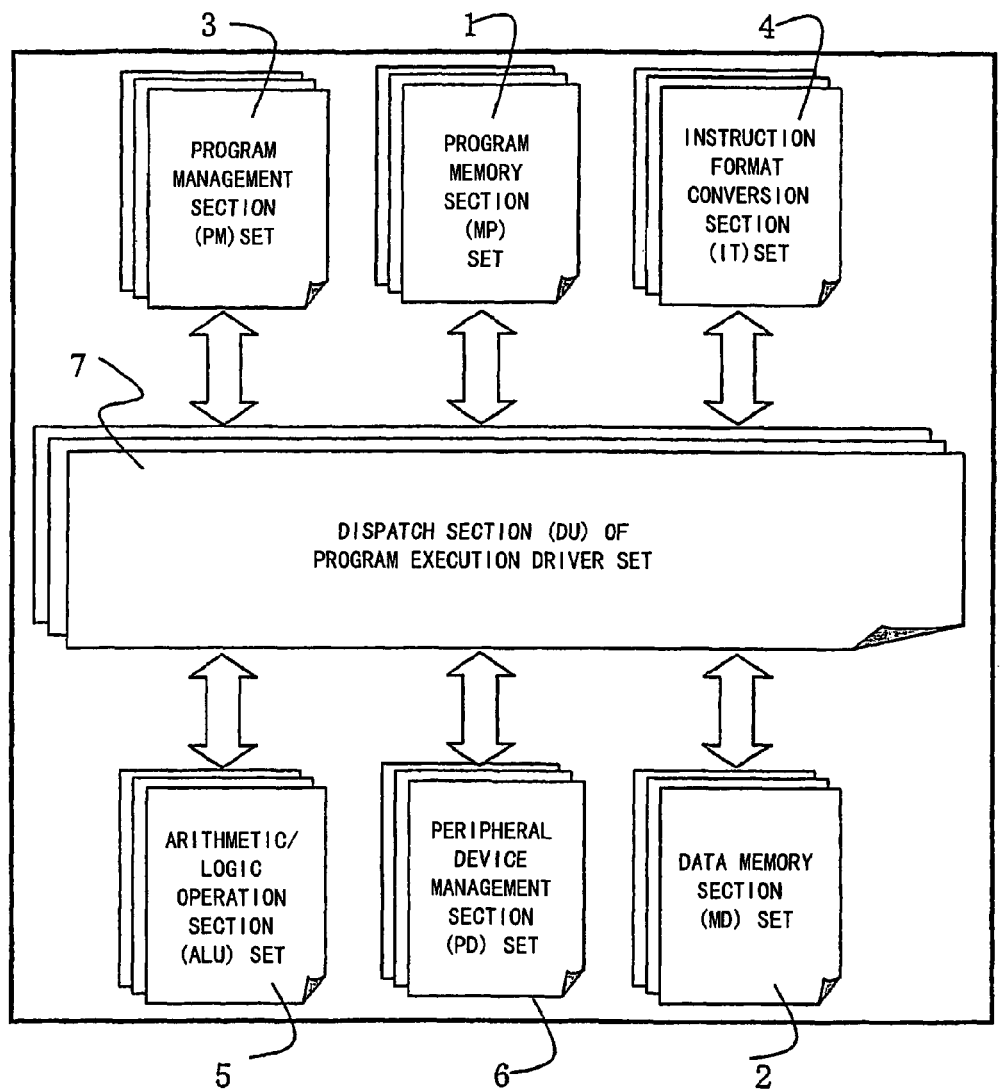
FIG. 1 is a block diagram for illustrating the principle of the architecture according to an embodiment of the invention.

A novel computer architecture and computer processor (called as an "L" computer architecture and an "L" structure processor hereinafter) can be designed based on the "L" driving method for driving computer program/instruction execution according to the invention. FIG. 1 is a diagram for illustrating the principle for the "L" computer architecture according to an embodiment of the invention. Since the aim of the description is to illustrate the principle for the "L" driving method for driving computer program/instruction execution, the "L" computer architecture and "L" structure processor, instead of designing a physical "L" structure processor, the schematic block diagram for the principal architecture is simplified or omitted, for example, the clock section, the bus section and the like are omitted, and the illustration for the I/O interface and the peripheral device section is schematic. For the same reason, a very simplified instruction system is designed in the present application, as shown in APPENDIX.

As a feature of the "L" driving method for driving computer program/instruction execution, and the computer processor architecture and computer processor using the method, a PED for driving the program execution is provided for each of multiple programs. In the embodiment of the invention, the PED is designed as an information block formed by a set of information units. On support of the system hardware, the set of the information units, i.e., the PED, "goes" sequentially to corresponding functional sections for performing specified functional operations such as read operation, operating operation, and write operation on operands of an instruction, based on the operation code of the currently carried instruction by the PED. A PED is comprised of:

| 0 | 1 | 2 | 3 | 4 | 5 | 6 | 7 | 8 | 9 | 10 | 11 | 12 | 13-28 |
|---|---|---|---|---|---|---|---|---|---|---|---|---|---|
|   |   |   |   |   |   |   | MPno | MPnu | PC | MDno | MDnu | PrNo | R0-R15 | wherein the PED is comprised of 29 units, with the respective units being described and defined as follows:

Unit 0-Unit 6: runtime work units for storing temporary/intermediate results in the execution progress of the program, wherein unit 0 called as a NEXT unit stores the number of a functional section to which the PED currently "goes" to request a service. Units 1-6 vary depending on the current driven instruction, and specific functions of the units 1-6 will be described in detail upon describing functions of the respective sections. It should be particularly noted that unit 1 is sometimes called as a ΔPC unit. When ΔPC=0, it indicates that the current instruction is an END instruction. When ΔPC=1, it indicates that the current instruction is a non-transfer-type instruction. When ΔPC>1 or ΔPC<0, it indicates that the current instruction is a transfer-type instruction.

Unit 7: the program memory section number (MPno), for storing the number of a program memory section in which the program driven by the PED is resident.

Unit 8: the amount of program memory sections (MPnu). When the program space to be occupied by one program is larger than the capacity of a program memory section, the program can be placed into multiple consecutive program memory sections adjacent with each other, sequentially. The unit 8 is used for storing the amount of the program memory sections that the program occupies consecutively. If the value of the MPnu is greater than 1, the value of the MPno is the number of the first program memory section.

Unit 9: an internal address of a program memory section (PC), for storing the current program instruction address which is an internal address of a program memory section.

Unit 10: the data memory section number (MDno), for storing the number of a data memory section occupied by the program driven by the PED.

Unit 11: the amount of data memory sections (MDnu). When the data space to be occupied by a program is larger than the capacity of a data memory section, the data for the program can be placed into multiple consecutive program memory sections adjacent with each other, sequentially. The unit 11 is used for storing the amount of the data memory sections that the program occupies consecutively; if the value of the MDnu is greater than 1, the value of the MPno is the number of the first data memory section.

Unit 12: a program number (PrNo), for identifying respective programs when two or more programs are running.

Unit 13-unit 28: 16 numbers of general purpose registers R0-R15. In the embodiments, the 16 numbers of general purpose registers R0-R15 are designed as a part of the PED.

In a conventional computer processor, the set of registers is commonly designed as a hardware section, comprised of electric memory means and electric read/write means as hardware. In order to distinguish from the below, such a design mode for the set of registers can be called as a fixed design mode for the set of registers. As for the "L" structure processor, the set of registers can be designed in a fixed hardware design mode. However, in the embodiment, the set of registers is designed as a component of the PED, and is transported among the respective sections with the PED. Such a design mode for the set of registers can be called as a dynamic design mode for the set of registers. The design has an advantage for not only canceling the transmission time taken by the read/write registers, but also canceling wait time delay due to the simultaneous access of the set of registers by multiple programs. It also has a disadvantage of a huge usage for the resources.

FIG. 1 illustrates the respective hardware functional sections in the system according to the embodiment of the invention. The main functions of the respective functional sections and the contents of the PED that "goes" into and/or out of the sections are shown as below:

1) A Memory Functional Section (1) section 1: called as program memory section MP, for providing the service of write/read of the program memory section, wherein multiple MP sections operable in parallel and independently can be provided. The main operation of each of the MP sections is as follows:

The MP maintains an input queue in which all of the PED requesting the processing by the MP are queued; and an output queue in which all of the processed PED are queued for a dispatch service provided by a DU section.

request of read: If the PED in the header of the current input queue is requesting a read operation, a section internal address PC for the program is read from the PED to an address register of the MP. A read operation for the MP is initiated to fetch the current instruction of the program which is then written into a corresponding unit of the current PED. The NEXT unit of the PED is set as IT, and the PED is then written into an output queue of the MP.

request of write: If the PED in the header of the current queue is requesting a write operation, the required operation is similar to a write operation for the data memory section, which is omitted to be described here.

the above operations are repeated. If the input queue of the MP is empty or the output queue thereof is full, a null operation is performed once.

the contents of the constituent units of the PED in the input queue of an MP section are as follows:

| 0 | 7 | 8 | 9 | 10 | 11 | 12 | 13-28 |
|---|---|---|---|---|---|---|---|
| MPr | MPno | MPnu | PC | MDno | Mdnu | PrNo | R0-R15 | wherein the MPr in the unit 0 indicates that the destination section is an MP and a "read" operation is requested. It should be noted that, in order to simplify, once the constituent units such as unit 1-unit 6 of the PED are not involved currently, they would be omitted. The same is adapted for the following.

The contents of the constituent units of the PED in the output queue of an MP section are as follows, wherein "I" in the unit 1 is a fetched instruction, such as LDI R0, C.

| 0 | 1 | 7 | 8 | 9 | 10 | 11 | 12 | 13-28 |
|---|---|---|---|---|---|---|---|---|
| IT | I | MPno | MPnu | PC | MDno | Mdnu | PrNo | R0-R15 |

Note, in the embodiment, the specific process for writing the program itself into the program memory section is omitted, and thus the contents for the constituent units of the PED are omitted. In fact, the process is similar to that for writing the data into a corresponding data memory section.

(2) section 2: called as data memory section MD, for providing the service of write/read of the data memory section, wherein multiple MD sections operable in parallel and independently can be provided. The main operation of each of the MD sections is as follows:

The MD maintains an input queue in which all of the PED requesting the processing by the MD are queued; and an output queue in which all of the processed PED are queued for a dispatch service provided by a DU section.

read operation: If the PED in the header of the current queue is requesting a read operation, the section internal address for the read operation is read from the PED and written to an address register of the MD. A read operation for the MD is initiated to read the content in a corresponding memory unit which is then written into a unit of the current PED. The NEXT unit of the PED is set as PM and a ΔPC unit of the PED is set as "1", and the PED is then written into an output queue of the MD.

write operation: If the PED in the header of the current queue is requesting a write operation, the data and the section interval address for the write operation are read from the PED and written to a data register and an address register of the MD respectively. A write operation for the MD is initiated to write the data to a corresponding MD memory unit. The NEXT unit of the PED is set as PM, the ΔPC unit of the PED is set as "1", and the PED is then written into an output queue of the MD.

The above operation processes are repeated. If the input queue of the MD is empty or the output queue thereof is full, a null operation is performed once.

The contents of the constituent units of the PED in the input queue of an MD section can be referred to the contents of the constituent units of the PED transmitted from an output queue of an IT section to an MD section.

The contents of the constituent units of the PED transmitted from an output queue of an MD section to a PM section are as follows:

| 0 | 1 | 7 | 8 | 9 | 10 | 11 | 12 | 13-28 |
|---|---|---|---|---|---|---|---|---|
| PM | 1 | MPno | MPnu | PC | MDno | Mdnu | PrNo | R0-R15 | wherein the unit 1 is ΔPC, and the value for the current instruction is "1".

2) An Operation Functional Section (1) section 3: called as program management section PM, for providing the service of management of running of the PED, wherein multiple PM sections operable in parallel and independently can be provided. The main operation of each of the PM sections is as follows:

The PM maintains an input queue in which all of the PED requesting the processing by the PM are queued; and an output queue in which all of the processed PED are queued for a dispatch service provided by a DU section.

to enable a PED to run: Enabling the PED for one program by the system management program is substantially to write the PED for the program into an input queue of the PM. When the PM processes the PED, the NEXT unit of the PED is set as "MP" (fetching instruction), and It is then written into an output queue of the PM.

to continue to run a PED: At the last step for the current instruction execution for driving one program by each of the PED, it is "return to the PM". If the current instruction is not an end instruction, the PM controls the PED to continue to run: carry out unit 9←unit 9+unit 1, that is, PC←PC+ΔPC, the NEXT unit is set as "MP", and the PED is then written into an output queue of the PM.

to terminate a PED's running: When an end instruction is executed by a program, the PM terminates the execution of the program by deleting the PED of the program. Before the end instruction is executed by the program, one or more resource-release-type instructions are required to be executed.

The above operation processes are repeated. If the input queue of the PM is empty or the output queue thereof is full, a null operation is performed once.

The contents of the constituent units of the received PED in the input queue of a PM section are as follows:

| 0 | 1 | 7 | 8 | 9 | 10 | 11 | 12 | 13-28 |
|---|---|---|---|---|---|---|---|---|
| PM | ΔPC | MPno | MPnu | PC | MDno | Mdnu | PrNo | R0-R15 | wherein the unit 1 is ΔPC, whose value is 0, 1 or offset for transfer.

The contents of the constituent units of the PED transmitted from an output queue of a PM section to an MP section are as follows:

| 0 | 7 | 8 | 9 | 10 | 11 | 12 | 13-28 |
|---|---|---|---|---|---|---|---|
| MPr | MPno | MPnu | PC | MDno | Mdnu | PrNo | R0-R15 | wherein the MPr in the unit 0 indicates that the destination section is an MP and a "read" operation is requested.

(2) section 4: called as instruction format conversion section IT, for providing the service of instruction decoding and instruction format conversion, wherein multiple IT sections operable in parallel and independently can be provided. The main operation of each of the IT sections is as follows:

The IT maintains an input queue in which all of the PED requesting the processing by the IT are queued; and an output queue in which all of the processed PED are queued for a dispatch service provided by a DU section.

As for the PED requesting an instruction format conversion, the IT performs format conversion of the current instruction stored in the PED, sets the units such as NEXT unit based on this, and then sends the PED to the output queue of the IT.

The above operation processes are repeated. If the input queue of the IT is empty or the output queue thereof is full, a null operation is performed once.

The contents of the constituent units of the PED in the input queue of an IT section are as follows, wherein "I" in the unit 1 is a fetched instruction, such as LDI R0, C.

The contents of the constituent units of the PED in the output queue of an IT section vary depending on the current instruction I, and are shown as follows:

The contents of the constituent units of the PED transmitted from an IT to a PM are shown as:

LDI Rd, C

| 0 | 1 | 7 | 8 | 9 | 10 | 11 | 12 | 13-28 |
|---|---|---|---|---|----|----|----|-------|
| PM | 1 | MPno | MPnu | PC | MDno | Mdnu | PrNo | R0-R15 | wherein the unit 1 is ΔPC, and the value for the current instruction is "1".

MV Rd, Rs

| 0 | 1 | 7 | 8 | 9 | 10 | 11 | 12 | 13-28 |
|---|---|---|---|---|----|----|----|-------|
| PM | 1 | MPno | MPnu | PC | MDno | Mdnu | PrNo | R0-R15 | wherein the unit 1 is ΔPC, and the value for the current instruction is "1".

The contents of the constituent units of the PED transmitted from an IT to an MD are shown as:

LD Rd, Rs

| 0 | 1 | 2 | 3 | 7 | 8 | 9 | 10 | 11 | 12 | 13-28 |
|---|---|---|---|---|---|---|----|----|----|-------|
| MDr | PM | [Rd] | [Rs] | MPno | MPnu | PC | MDno | Mdnu | PrNo | R0-R15 | wherein the MDr in the unit 0 indicates that the destination section is an MD and a "read" operation is requested; the [Rd] and [Rs] in the units 2 and 3 indicate the values of the registers Rd and Rs respectively.

STI Rd, C

| 0 | 1 | 2 | 3 | 7 | 8 | 9 | 10 | 11 | 12 | 13-28 |
|---|---|---|---|---|---|---|----|----|----|-------|
| MDIw | PM | [Rd] | C | MPno | MPnu | PC | MDno | MDnu | PrNo | R0-R15 | wherein the MDIw in the unit 0 indicates that the destination section is an MD and an "immediate number write" operation is requested; the [Rd] in the unit 2 indicates the value of the register Rd.

ST Rd, Rs

| 0 | 1 | 2 | 3 | 7 | 8 | 9 | 10 | 11 | 12 | 13-28 |
|---|---|---|---|---|---|---|----|----|----|-------|
| MDw | PM | [Rd] | [Rs] | MPno | MPnu | PC | MDno | Mdnu | PrNo | R0-R15 | wherein the MDw in the unit 0 indicates that the destination section is an MD and a "write" operation is requested; the [Rd] and [Rs] in the units 2 and 3 indicate the values of the registers Rd and Rs respectively.

The contents of the constituent units of the PED transmitted from an IT to an ALU are shown as:

ADDI Rd, C

| 0 | 1 | 2 | 3 | 4 | 7 | 8 | 9 | 10 | 11 | 12 | 13-28 |
|---|---|---|---|---|---|---|---|----|----|----|-------|
| ALUI+ | PM | Rd | [Rd] | C | MPno | MPnu | PC | MDno | MDnu | PrNo | R0-R15 | wherein the ALUI+ in the unit 0 indicates that the destination section is an ALU and an "immediate number addition" operation is requested. As for the instructions such as SUBI, MULI and DIVI, the contents of the constituent units of the corresponding PED are similar to the above, except that the unit 0 is set as ALUI-, ALUI*, and ALUI÷ respectively.

ADD Rd, Rs1, Rs2

| 0 | 1 | 2 | 3 | 4 | 7 | 8 | 9 | 10 | 11 | 12 | 13-28 |
|---|---|---|---|---|---|---|---|---|---|---|---|
| ALU+ | PM | Rd | [Rs1] | [Rs2] | MPno | Mpnu | PC | Mdno | Mdnu | PrNo | R0-R15 | wherein the ALU+ in the unit 0 indicates that the destination section is an ALU and an "addition" operation is requested. As for the instructions, such as SUB, MUL, DIV and the like, they are similar to the above.

JEQI Rs, C

| 0 | 1 | 2 | 3 | 7 | 8 | 9 | 10 | 11 | 12 | 13-28 |
|---|---|---|---|---|---|---|---|---|---|---|
| ALUIj | PM | C | [Rs] | MPno | MPnu | PC | MDno | Mdnu | PrNo | R0-R15 | wherein the ALUIj in the unit 0 indicates that the destination section is an ALU and an "intermediate number transfer judgment" operation is requested. As for the instructions like JNEI, they are similar to the above.

JEQ Rs1, Rs2

| 0 | 1 | 2 | 3 | 7 | 8 | 9 | 10 | 11 | 12 | 13-28 |
|---|---|---|---|---|---|---|---|---|---|---|
| ALUj | PM | [Rs2] | [Rs1] | MPno | MPnu | PC | Mdno | Mdnu | PrNo | R0-R15 | wherein the ALUj in the unit 0 indicates that the destination section is an ALU and a "transfer judgment" operation is requested. As for the instructions like JNE, they are similar to the above.

SLT Rd, Rs1, Rs2

| 0 | 1 | 2 | 3 | 4 | 7 | 8 | 9 | 10 | 11 | 12 | 13-28 |
|---|---|---|---|---|---|---|---|---|---|---|---|
| ALUslt | PM | Rd | [Rs1] | [Rs2] | MPno | MPnu | PC | Mdno | MDnu | PrNo | R0-R15 | wherein the ALUslt in the unit 0 indicates that the destination section is an ALU and a "less than setting" operation is requested. As for the instructions like SLE, SGT, SGE, SEQ, SNE, they are similar to the above.

(3) section 5: called as an arithmetic/logic operation section ALU, for providing the services of arithmetic/logic operations, wherein multiple ALU sections operable in parallel and independently can be provided. The main operation of each of the ALU sections is as follows:

The ALU maintains an input queue in which all of the PED requesting the processing by the ALU are queued; and an output queue in which all of the processed PED are queued for a dispatch service provided by a DU section.

Before requesting an ALU to carry out a service of arithmetic/logic operations, the PED has controlled to make the all operands required by the instruction to be ready and be stored in corresponding units of the PED. The ALU performs the requested arithmetic/logic operation on the corresponding operands which are stored in the PED. The result is stored in a corresponding unit of the PED. The NEXT unit is set as "PM" and the unit 1, i.e., the $\Delta PC$ unit is set based on the requirement of the instruction, and the PED is then written into the output queue of the ALU.

The above operation processes are repeated. If the input queue of the ALU is empty or the output queue thereof is full, a null operation is performed once.

The contents of the constituent units of the PED in the input queue of an ALU section can be referred to the contents of the constituent units of the PED transmitted from an output queue of an IT section to an ALU.

The contents of the constituent units of the PED in the output queue of an ALU section are as follows:

| 0 | 1 | 7 | 8 | 9 | 10 | 11 | 12 | 13-28 |
|---|---|---|---|---|---|---|---|---|
| PM | ΔPC | MPno | Mpnu | PC | MDno | Mdnu | PrNo | R0-R15 | wherein the unit 1 is $\Delta PC$, whose value is 0, 1 or offset for transfer.

(4) section 6: called as peripheral device management section PD, for providing the service of managing peripheral devices such as a display device, a keyboard, a mouse, a printer and a communication device; and data input/output with a host.

3) Section 7: called as dispatch section DU of the PED, for providing the service of transportation and dispatch of the PED from an output queue of one section to an input queue of another section, wherein multiple DU sections operable in parallel and independently can be provided. The main operation of each of the DU sections is as follows:

The DU checks whether the output queue of each of the sections in each of the set of sections is non-empty or not, one by one in a predetermined sequence. As for a non-empty output queue, the DU reads one PED from the queue, and checks whether the input queue of the destination section in the set of destination sections is non-full or not, based on the set number of the set of destination sections and the number of the destination section in the set indicated by the NEXT unit in the PED. If it is non-full, the PED is dispatched into the input queue of the destination section in the set of destination sections. The above process is only adapted for the PM, MP and MD. As for IT and ALU, it is sufficient only if an arbitrary input queue of the destination section in the set of destination sections is a non-full section.

The above operation processes are repeated. If the output queues of all of the sections in all the sets of sections are empty, or corresponding input queues are all full though some output queues are non-full, a null operation is performed once.

FIG. 1 also illustrates a connection relationship among the respective sections in the system according to the embodiment of the invention. The sections 1-6 connect the tail of their respective input queues and the header of their respective output queues to the section 7 through their respective one or two sets of signal lines, respectively.

Figure 2:
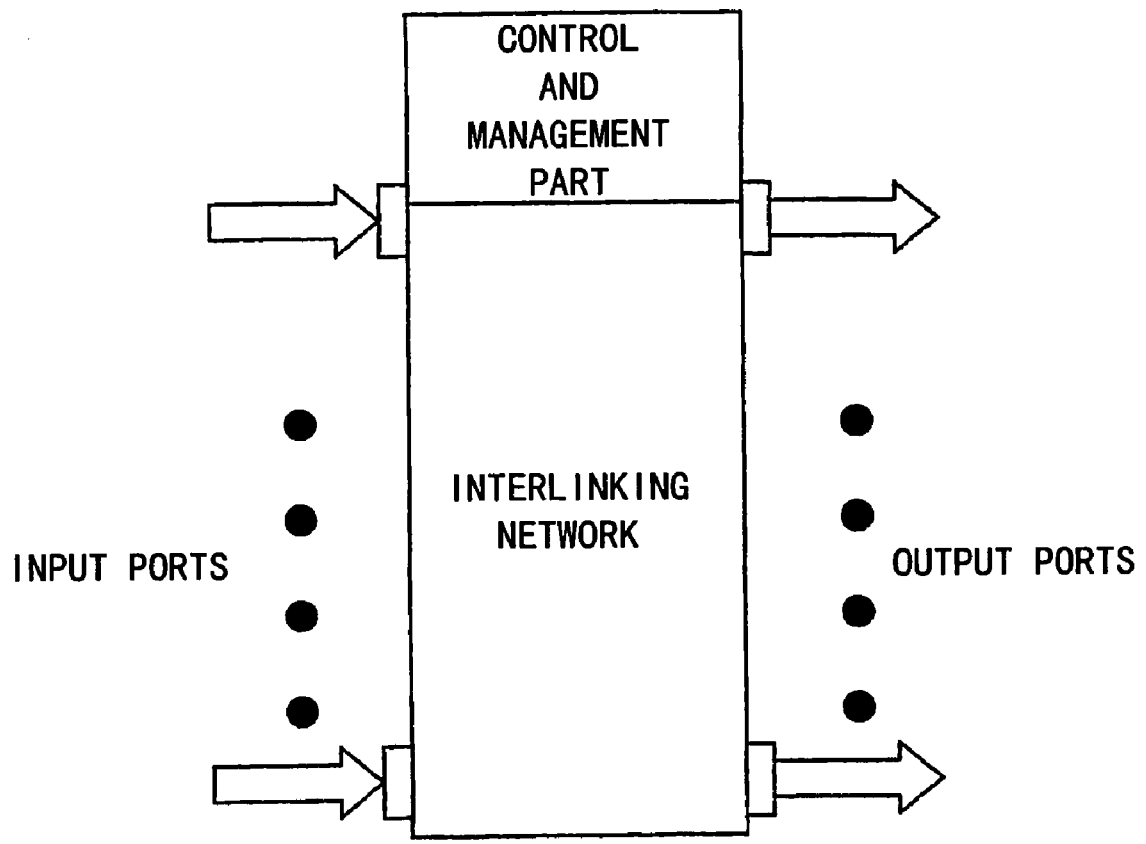
FIG. 2 is a block diagram for illustrating the structure of a PED dispatch section according to the embodiment of the invention.

FIG. 2 is a block diagram for illustrating the structure of the section 7 according to the embodiment of the invention. The section 7 is comprised of at least multiple data input ports, multiple data output ports, an interlinking network part and a control and management part. The control and management part of the section 7 is used for interlinking control and management, such as detection on idleness or busyness of the respective ports, determination on priority, selection of route and the like. The interlinking network part of the section 7 is used to connect the multiple data input ports to the multiple data output ports, and can be designed in various methods. Two typical methods are listed as below.

Figure 3:
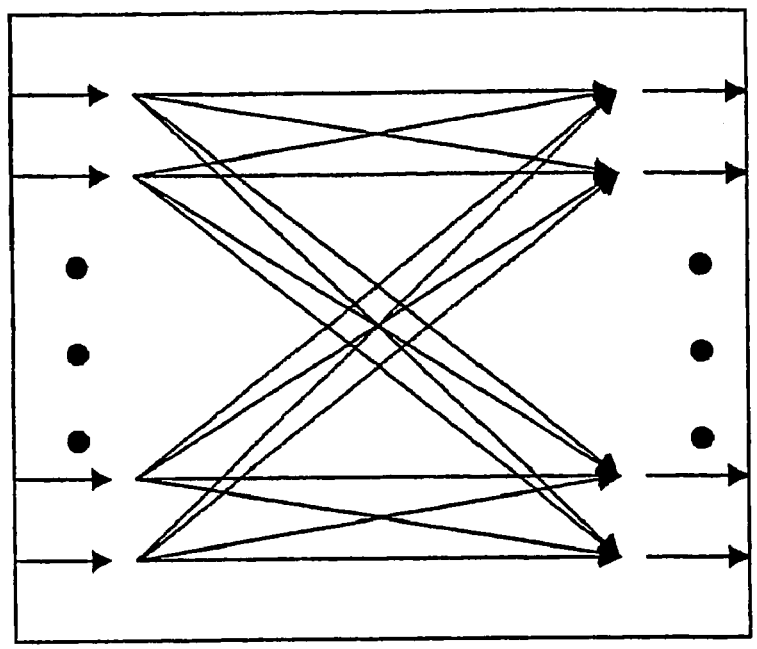
FIG. 3 is a block diagram for illustrating the structure of communicating network part designed in a cross interconnection mode in the PED dispatch section according to the embodiment of the invention.

FIG. 3 is a block diagram for illustrating the structure of interlinking network part designed in a cross interconnection mode in the dispatch section according to the embodiment of the invention. The interlinking network part of the section 7 can be designed in a cross interconnection mode, wherein any one of the input ports is connected to all of or a part of the output ports.

Figure 4:
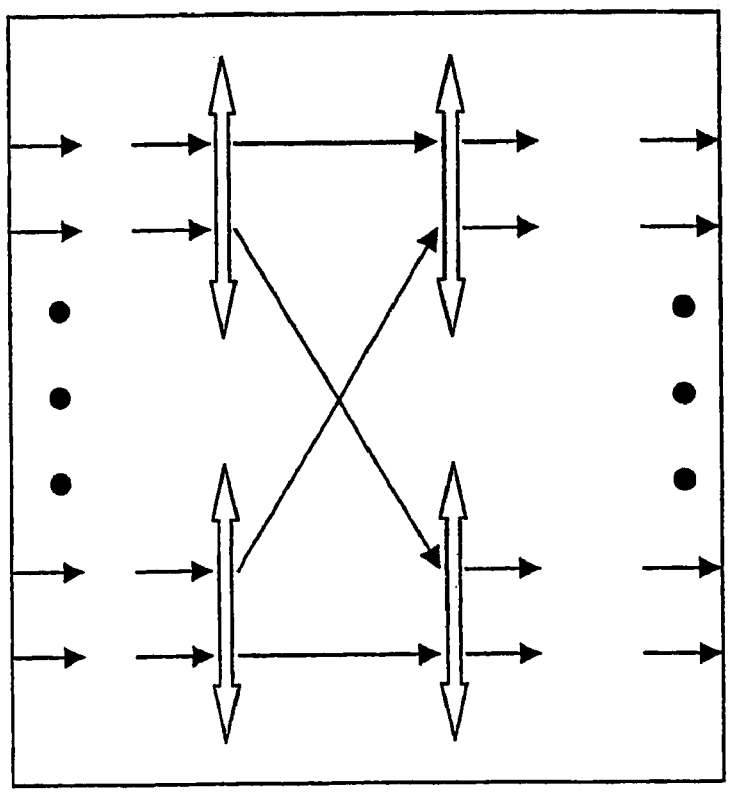
FIG. 4 is a block diagram for illustrating the structure of communicating network part designed in a multi-bus interconnection mode in the PED dispatch section according to the embodiment of the invention.

FIG. 4 is a block diagram for illustrating the structure of interlinking network part designed in a multi-bus interconnection mode in the dispatch section according to the embodiment of the invention. The interlinking network part of the section 7 can be designed in a multiple-bus mode, wherein all of the input ports and the output ports are grouped and connected to a bus respectively, with a cross interconnection being used to link all of the buses.

Figure 5:
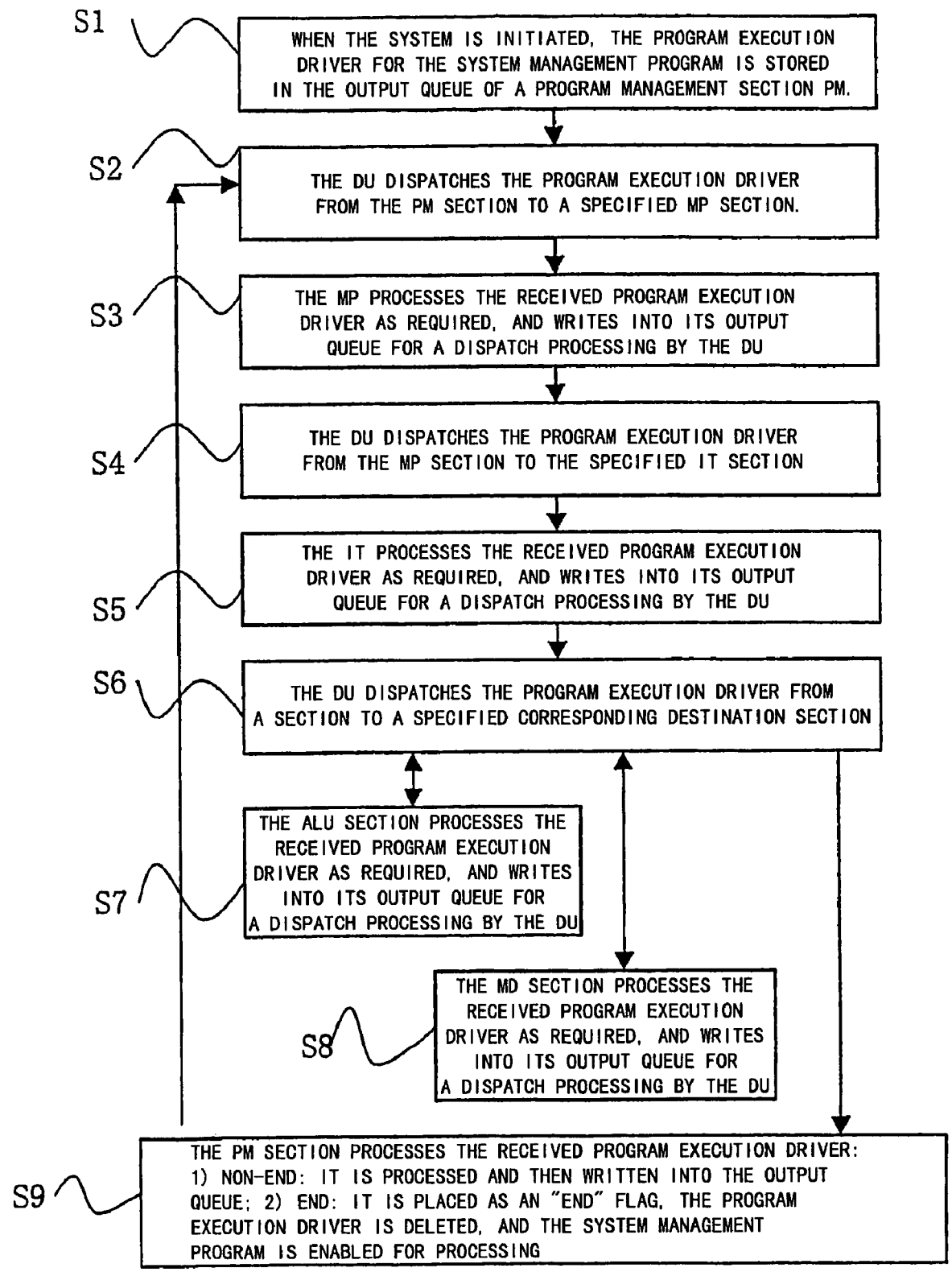
FIG. 5 is a flow diagram for illustrating the operation procedure according to the embodiment of the invention.

FIG. 5 is a flow diagram for illustrating the operation procedure according to the embodiment of the invention, i.e., the operation flow for driving program execution by the PED within the novel computer processor. The specific steps are shown as follows:

step S1) When the system is initiated, the PED for at least one program such as a system management program is stored in the output queue of a program management section PM. The flow proceeds to step S2.

step S2) When a DU section detects that the output queue of a PM section is non-empty, and the input queue of the specific destination MP section indicated by the NEXT unit of the PED in the header of the current queue is non-full, the PED in the header of the output queue of the PM section is dispatched to the input queue of a corresponding MP section for processing by the section. The flow proceeds to step S3.

step S3) When an MP section detects that its input queue is non-empty, an instruction is fetched from the program memory section managed by it, based on the PC address specified by the PC unit of the PED in the header of the input queue. The fetched instruction is stored into the unit 1 of the PED. If the output queue of the MP section is full at this time, it awaits an empty position. When an empty position occurs, the PED on which the process is completed is written into the output queue of the MP section for dispatch processing by the DU. The flow proceeds to step S4.

step S4) When a DU section detects that the output queue of an MP section is non-empty, the destination section indicated by the NEXT unit of the PED in the header of the current queue is an "IT", and the input queue of at least an IT section is non-full, the PED in the header of the output queue of the MP section is dispatched to the input queue of a corresponding IT section for processing by the section. The flow proceeds to step S5.

step S5) When an IT section detects that its input queue is non-empty, a format conversion is performed on the instruction carried by the PED which is in the header of the input queue of the IT section, and the converted result is stored in a corresponding unit of the PED. If the output queue of the IT section is full at this time, it awaits an empty position. When an empty position occurs, the PED on which the process is completed is written into the output queue of the IT for dispatch processing by the DU. The flow proceeds to step S6.

step S6) When a DU section detects that the output queue of a section such as any one of the IT, ALU and MD sections is non-empty, and the input queue of the destination section indicated by the NEXT unit of the PED in the header of the current queue is non-full, the PED in the header of the output queue of the section is dispatched to the input queue of a corresponding section for processing by the section. The destination section includes 1) an ALU section, which can be an arbitrary ALU section having an empty position in its output queue, and the flow then proceeds to step S7; 2) an MD section, which must be the MD section specified by the NEXT unit of the above PED, and the flow then proceeds to step S8; 3) a PM section, which must be the PM section specified by the NEXT unit of the above PED, and the flow then proceeds to step S9.

step S7) When an ALU section detects that its input queue is non-empty, a specified arithmetic/logic operation is performed on the operands stored in corresponding units of the PED, based on the command in the NEXT unit of the PED in the header of the input queue. The operation result is stored into a corresponding unit of the PED. If the output queue of the ALU section is full at this time, it awaits an empty position. When an empty position occurs, the PED on which the process is completed is written into the output queue of the ALU section for dispatch processing by the DU. Herein, the destination section is a PM section. The flow proceeds to step S6.

step S8) When an MD section detects that its input queue is non-empty, a read/write operation in the data memory section managed by it is performed on the data in a unit of the PED, based on the read or write command in the NEXT unit of the PED in the header of the input queue, and the section internal address specified by a unit in the PED. If it is a read operation, the read data is stored to a unit of the PED. If the output queue of the MD section is full at this time, it awaits an empty position. When an empty position occurs, the PED on which the process is completed is written into the output queue of the MD for dispatch processing by the DU. Herein, the destination section is a PM section. The flow proceeds to the step S6.

step S9) When a PM section detects that its input queue is non-empty, a corresponding operation is performed based on the command of the PED in the header of its input queue: 1) a non-END instruction, wherein the ΔPC unit has a non-zero value; the PM modifies the values of the units such as PC unit and the like as required, and the results are stored into corresponding units of the PED; if the output queue of the PM section is full at this time, it awaits an empty position; when an empty position occurs, the PED on which the process is completed is written into the output queue of the PM for dispatch processing by the DU, and the flow proceeds to the step S2; 2) an END instruction, wherein the ΔPC unit has a value of "0"; the PM sets a flag to be "end", and the PED is deleted from the input queue. The system management program is enabled to schedule other program for execution.

The software section of the system is comprised of a simplified system management program. In order to emphasize on the technology principle of the invention, only a simplified program schedule function is provided in the system management program, and a program schedule table is maintained. When the system is initiated, the PED of the system management program is loaded to a PM section of the system. The PED drives the system management program to enable the PED of all the user programs one by one.

The present application essentially describes the technology concept of the invention. As appreciated by those skilled in the art, there are many other modes or methods for designing the computer processor based on the "L" driving method for driving the computer program/instruction execution according to the invention. Furthermore, there are also many other modes or methods for implementing the PED and for implementing management and control of the program execution by using the PED. That is, any equivalent modification, alternative and change based on the technology concept of the invention are fallen within the protection scope of the invention.

APPENDIX

The Simplified Instruction System

| | | | |
|---|---|---|---|
| MOVE instruction: | MOV Rd,Rs | Rd←Rs | |
| LOAD instruction: | LD Rd,Rs | Rd←DM[Rs] | |
| | LDI Rd,C | Rd←C | |
| STORE instruction: | ST Rd,Rs | DM[Rd]←Rs | |
| | STI Rd,C | DM[Rd]←C | |
| Jump instruction: | JEQ Rs1,Rs2 | IF(Rs1=0) PC←PC+Rs2 | ELSE PC←PC+1 |
| | JNE Rs1,Rs2 | IF(Rs1≠0) PC←PC+Rs2 | ELSE PC←PC+1 |
| | JEQI Rs1,C | IF(Rs1=0) PC←PC+C | ELSE PC←PC+1 |
| | JNEI Rs1,C | IF(Rs1≠0) PC←PC+C | ELSE PC←PC+1 |
| Operation instruction: | ADD Rd,Rs1,Rs2 | Rd←Rs1+Rs2 | |
| | SUB Rd,Rs1,Rs2 | Rd←Rs1−Rs2 | |
| | MUL Rd,Rs1,Rs2 | Rd←Rs1*Rs2 | |
| | ADDI Rs,C | Rs←Rs+C | |
| | SUBI Rs,C | Rs←Rs−C | |
| | MULI Rs,C | Rs←Rs*C | |
| Logic instruction: | OR Rd,Rs1,Rs2 | Rd←Rs1 OR Rs2 | |
| | AND Rd,Rs1,Rs2 | Rs←Rs1 AND Rs2 | |
| | ORI Rs,C | Rs←Rs OR C | |
| | ANDI Rs,C | Rs←Rs AND C | |
| Set instruction: | SLT Rd,Rs1,Rs2 | IF(Rs1<Rs2) Rd←1 | ELSE Rd←0 |
| | SLE Rd,Rs1,Rs2 | IF(Rs1<=Rs2) Rd←1 | ELSE Rd←0 |
| | SGT Rd,Rs1,Rs2 | IF(Rs1>Rs2) Rd←1 | ELSE Rd←0 |
| | SGE Rd,Rs1,Rs2 | IF(Rs1>=Rs2) Rd←1 | ELSE Rd←0 |
| | SEQ Rd,Rs1,Rs2 | IF(Rs1=Rs2) Rd←1 | ELSE Rd←0 |
| | SNE Rd,Rs1,Rs2 | IF(Rs1≠Rs2) Rd←1 | ELSE Rd←0 |

Resource Management Instruction:

| | |
|---|---|
| GETMD Rd,Rs | application for occupying [Rs] numbers of consecutive MD sections, |
| | Rd← acquired No. for the MD sections. |
| GETMDI Rd,C | application for occupying C numbers of consecutive MD sections |
| | Rd← acquired No. for the MD sections. |
| RETMD Rs1,Rs2 | application for releasing [Rs2] numbers of consecutive MD sections beginning with [RS1]. |
| GETMDI Rs,C | application for releasing C numbers of consecutive MD sections beginning with [RS1]. |
| End instruction: | the program is terminated. |
| END | |

What is claimed is:

1. A driving method for driving computer program/instruction execution, wherein on condition that no interrupt process is involved, multiple programs are executed in parallel on a single computer processor at the same time; the computer processor comprises a system management program which has a program scheduling function and maintains at least a data structure called as a program schedule table, the driving method comprises:

activating the system management program, that is, loading program execution driving means of the system management program into an operation control section of the computer processor to thereby control execution of the system management program;

subsequently for each of the programs, executing, by the system management program, the following operations:

when executable codes are generated for a program, writing, by the system management program, related information for driving execution of the program into a corresponding item of the program schedule table; at this time, the program being in an execution wait state; and when predetermined conditions for invoking and executing the program are met, creating and activating, by the system management program, program execution driving means of the program; thereafter, the program being in an execution state, and being executed independently under management and control of its own program execution driving means;

when an end instruction for each of the programs is executed, activating the program execution driving means of the system management program to perform an end process for the program; finally, deleting the program execution driving means for the program from the program schedule table.

2. The driving method for driving computer program/instruction execution as defined in claim 1, wherein the program execution driving means for each of the programs includes at least all related information for describing and defining attribute features of the program and for managing and controlling the execution of the program.

3. The driving method for driving computer program/instruction execution as defined in claim 2, wherein the program execution driving means for each of the programs controls to fetch current instruction to be executed from a corresponding memory section of the computer processor, based on its stored resident information for the program.

4. The driving method for driving computer program/instruction execution as defined in claim 3, wherein the resident information includes a program memory section number and a section internal address.

5. The driving method for driving computer program/instruction execution as defined in claim 3, wherein the program execution driving means for the program are directed sequentially to corresponding functional sections of the computer processor for performing specified functional operations on operands of an instruction, based on requirements of operation codes of the current carried instruction.

6. The driving method for driving computer program/instruction execution as defined in claim 1, wherein the program execution driving means is comprised of:

unit 0-unit 6: runtime work units for storing temporary/intermediate results in the execution progress of the program, wherein the unit 0 represents the number of a functional section to which the program execution driving means is going to request a service, and thus is called as a NEXT unit;

unit 7: the section number MPno for a program memory section, for storing the section number for the program memory section which the program is resident in;

unit 8: a number MPnu of program memory sections, for storing the number of the program memory sections that the program occupies consecutively;

unit 9: a section internal address PC for a program memory section, for storing the section internal address of the program memory section for the current executed instruction of the program;

unit 10: the section number MDno for a data memory section, for storing the section number for the data memory section which the program occupies;

unit 11: a number MDnu of program memory sections, for storing the number of the data memory sections that the program occupies consecutively;

unit 12: a program number PrNo, for identifying respective programs;

unit 13-unit 28: 16 numbers of general purpose registers R0-R15.

7. The driving method for driving computer program/instruction execution as defined in claim 6, wherein the general purpose registers of all the program execution driving means are implemented by one or more hardware sections operable in parallel.

8. The driving method for driving computer program/instruction execution as defined in claim 1, wherein the computer processor comprises:

one or more memory sections operable in parallel, including two types of the following memory sections:

a program memory section MP for providing services on writing/reading the program memory section; and a data memory section MD for providing services on writing/reading the data Memory section;

one or more operation/control sections operable in parallel, including four types of the following operation control sections:

a program management section PM for providing services on managing the running of the program execution driving means;

an instruction format conversion section IT for providing services on instruction decoding and instruction format conversion;

an arithmetic/logic operation section ALU for providing services on arithmetic/logic operations; and a peripheral device section PD for managing and controlling peripheral device sections;

one or more dispatch sections DU operable in parallel, for providing services on transporting and dispatching the program execution driving means from an output queue of one section to an input queue of another section.

| 0 | 1 | 2 | 3 | 4 | 5 | 6 | 7 | 8 | 9 | 10 | 11 | 12 | 13-28 |
|---|---|---|---|---|---|---|---|---|---|---|---|---|---|
| | | | | | | | MPno | MPnu | PC | MDno | MDnu | PrNo | R0-R15 |

9. The driving method for driving computer program/instruction execution as defined in claim 8, wherein each of the above sections has an input buffer means and an output buffer means, and operates in a request/service mode in which when a request is received, that is, the input buffer means is non-empty, a specified service is initiated and performed, and a result is stored into the output buffer means.

10. The driving method for driving computer program/instruction execution as defined in claim 9, wherein after the system management program creates the program execution driving means for the program, the program execution driving means for the program is stored into an output queue of one program management section PM.

11. The driving method for driving computer program/instruction execution as defined in claim 9, wherein when a dispatch section DU detects that the output queue of the program management section PM is non-empty, and the input queue of the specific destination program memory section MP indicated by the NEXT unit of the program execution driving means currently located at the header of the output queue is non-full, the program execution driving means located at the header of the output queue of the program management section PM is dispatched into the input queue of the corresponding program memory section MP.

12. The driving method for driving computer program/instruction execution as defined in claim 9, wherein when a program memory section MP detects that its input queue is non-empty, an instruction is read from the program memory section managed by it, based on a PC address specified by the PC unit of the program execution driving means located at the header of the input queue; the read instruction is stored into unit 1 of the program execution driving means; at this time, if the output queue of the program memory section MP is full, it awaits an empty position; when an empty position occurs, the program execution driving means on which the process is completed is written into its output queue.

13. The driving method for driving computer program/instruction execution as defined in claim 9, wherein when a dispatch section DU detects that the output queue of the program memory section MP is non-empty, the destination section indicated by the NEXT unit of the program execution driving means currently located at the header of the output queue is an instruction format conversion section IT, and an input queue of at least one instruction format conversion section IT is non-full, the program execution driving means located at the header of the output queue of the program memory section MP is dispatched into the input queue of the corresponding instruction format conversion section IT.

14. The driving method for driving computer program/instruction execution as defined in claim 9, wherein when an instruction format conversion section IT detects that its input queue is non-empty, a format conversion is performed on the instruction of the program execution driving means located at the header of the input queue, and the converted results are stored into corresponding units of the program execution driving means; at this time, if the output queue of the instruction format conversion section IT is full, it awaits an empty position; when an empty position occurs, the program execution driving means on which the process is completed is written into its output queue.

15. The driving method for driving computer program/instruction execution as defined in claim 9, wherein when a dispatch section DU detects that the output queue of any one of the instruction format conversion section IT, the arithmetic/logic operation section ALU and the data memory section MD is non-empty, and the input queue of the destination section indicated by the NEXT unit of the program execution driving means currently located at the header of the output queue is non-full, the program execution driving means located at the header of the output queue of the section is dispatched into the input queue of the corresponding destination section.

16. The driving method for driving computer program/instruction execution as defined in claim 9, wherein when an arithmetic/logic operation section ALU detects that its input queue is non-empty, a specified arithmetic/logic operation is performed on operands stored in corresponding units of the program execution driving means, based on the command in the NEXT unit of the program execution driving means located at the header of the input queue, and the operation result is stored into a corresponding unit of the program execution driving means; at this time, if the output queue of the arithmetic/logic operation section ALU is full, it awaits an empty position; when an empty position occurs, the program execution driving means on which the process is completed is written into its output queue; the destination section is the program management section PM at this time.

17. The driving method for driving computer program/instruction execution as defined in claim 9, wherein when an data memory section MD detects that its input queue is non-empty, a read/write operation in the data memory section managed by it is performed on the data in the program execution driving means, based on the read or write command in the NEXT unit of the program execution driving means located at the header of the input queue as well as the section internal address specified by the program execution driving means; if it is a read operation, the read data is stored into a corresponding unit of the program execution driving means; at this time, if the output queue of the data memory section MD is full, it awaits an empty position; when an empty position occurs, the program execution driving means on which the process is completed is written into its output queue; the destination section is the program memory section PM at this time.

18. The driving method for driving computer program/instruction execution as defined in claim 9, wherein when a program management section PM detects that its input queue is non-empty, a corresponding operation is performed based on requirements of the command in the program execution driving means located at the header of its input queue:
  a non-end instruction, wherein unit 1 of the program execution driving means has a non-zero value; the program management section PM modifies a value of a corresponding unit of the program execution driving means according to requirements, and stores the result into the corresponding unit of the program execution driving means; at this time, if the output queue of the PM section is full, it awaits an empty position; when an empty position occurs, the program execution driving means on which the process is completed is written into its output queue;
  an END instruction, wherein unit 1 of the program execution driving means has a value of "0"; the program management section PM sets a corresponding "end" flag, and deletes the program execution driving means from the input queue; and then the system management program is activated to schedule execution of other programs.

19. A computer processor comprising:
  a system management program which has a program scheduling function and maintains at least a data structure called as a program schedule table;
  one or more memory sections operable in parallel, including two types of the following memory sections:
    a program memory section MP for providing services on writing/reading the program memory section; and
    a data memory section MD for providing services on writing/reading the data memory section;
  one or more operation control sections operable in parallel, including four types of the following operation control sections:

a program management section PM for providing services on managing the running of the program execution driving means;
an instruction format conversion section IT for providing services on instruction decoding and instruction format conversion;
an arithmetic/logic operation section ALU for providing services on arithmetic/logic operations; and
a peripheral device section PD for managing and controlling any peripheral device sections;
one or more dispatch sections DU operable in parallel, for providing services on transporting and dispatching program execution driving means from an output queue of one section to an input queue of another section.

20. The computer processor as defined in claim 19, wherein it further comprises registers which are one or more hardware sections operable in parallel, or constituent components of the program execution driving means.

* * * * *